US012705937B2

(12) United States Patent
Haridas et al.

(10) Patent No.: US 12,705,937 B2
(45) Date of Patent: Aug. 11, 2026

(54) METHOD AND SYSTEM FOR MANAGING BATTERIES IN A VEHICLE

(71) Applicant: TVS MOTOR COMPANY LIMITED, Chennai (IN)

(72) Inventors: Anjali Haridas, Chennai (IN); Dipanjan Mazumdar, Chennai (IN); Valavanur Umasankar Kalpana, Chennai (IN); Vinay Harne, Chennai (IN)

(73) Assignee: TVS Motor Company Limited, Chennai (IN)

( * ) Notice: Subject to any disclaimer, the term of this patent is extended or adjusted under 35 U.S.C. 154(b) by 15 days.

(21) Appl. No.: 18/852,626

(22) PCT Filed: Mar. 3, 2023

(86) PCT No.: PCT/IN2023/050199
§ 371 (c)(1),
(2) Date: Sep. 30, 2024

(87) PCT Pub. No.: WO2023/187815
PCT Pub. Date: Oct. 5, 2023

(65) Prior Publication Data

US 2025/0252786 A1 Aug. 7, 2025

(30) Foreign Application Priority Data

Mar. 31, 2022 (IN) ............................ 202241019770

(51) Int. Cl.
*G07C 5/00* (2006.01)
*B60L 58/18* (2019.01)
(Continued)

(52) U.S. Cl.
CPC ............... *G07C 5/008* (2013.01); *G07C 5/04* (2013.01); *G07C 5/0825* (2013.01); *G07C 5/10* (2013.01);
(Continued)

(58) Field of Classification Search
CPC ........ G07C 5/008; G07C 5/04; G07C 5/0825; G07C 5/10; H01M 10/425; H01M 10/482;
(Continued)

(56) References Cited

U.S. PATENT DOCUMENTS

2011/0313613 A1* 12/2011 Kawahara .............. B60L 50/61 320/134
2012/0161692 A1* 6/2012 Kobayashi ............. B60L 58/13 320/109
(Continued)

FOREIGN PATENT DOCUMENTS

EP 2560265 A1 * 2/2013 ........... H01M 10/48
WO 2019211810 A1 11/2019

OTHER PUBLICATIONS

Furukawa Kimihiko et al., Oct. 19, 2010 English Machine Translation_EP2560265A1 provided by Patent Translate by EPO and Google (Year: 2010).*

(Continued)

*Primary Examiner* — Ashley L Redhead, Jr.
(74) *Attorney, Agent, or Firm* — Osha Bergman Watanabe & Burton LLP

(57) ABSTRACT

A battery management system (for managing a set of batteries in a vehicle) includes: a set of battery management units including a battery management unit for each battery in the set of batteries, the battery management units managing respective batteries in the set of batteries; a communication module for enabling communication with the bat-
(Continued)

tery management system and within the battery management system; and a vehicle monitoring unit, the vehicle monitoring unit receiving and monitoring system information data including vehicle information data from the vehicle and battery information data pertaining to each of the batteries in the set of batteries from the respective battery management units, the system information data being received using the communication module, the vehicle monitoring unit being configured to generate a user message based upon a comparison of the system information data and predetermined standard acceptable system information values; the user message being communicated to a user.

10 Claims, 2 Drawing Sheets

(51) Int. Cl.

*G07C 5/04* (2006.01)
*G07C 5/08* (2006.01)
*G07C 5/10* (2006.01)
*H01M 10/42* (2006.01)
*H01M 10/48* (2006.01)

(52) U.S. Cl.

CPC ....... *H01M 10/425* (2013.01); *H01M 10/482* (2013.01); *B60L 58/18* (2019.02); *H01M 2010/4271* (2013.01); *H01M 2010/4278* (2013.01); *H01M 2220/20* (2013.01)

(58) Field of Classification Search

CPC . H01M 2010/4271; H01M 2010/4278; H01M 2220/20; B60L 58/18; B60L 3/04; B60L 53/11; B60L 2240/42; B60L 2240/545; B60L 2240/547; B60L 2240/549; B60L 58/16; B60L 2240/70; B60L 2250/10; B60L 2250/16; B60L 2260/44; B60L 2260/50; B60L 53/66; Y02T 10/70

See application file for complete search history.

(56) References Cited

U.S. PATENT DOCUMENTS

2016/0163127 A1* 6/2016 Kim .................... G01R 31/52 701/36
2021/0380013 A1 12/2021 Moszynski et al.
2023/0177890 A1* 6/2023 Salter .................. G07C 5/0816 701/29.6
2024/0027539 A1* 1/2024 Jamison ............... G01R 31/392
2024/0116393 A1* 4/2024 Saito .................... B60L 53/67

OTHER PUBLICATIONS

International Search Report issued in corresponding International Application No. PCT/IN2023/050199, dated Jun. 6, 2023 (3 pages).
Written Opinion issued in corresponding International Application No. PCT/IN2023/050199, dated Jun. 6, 2023 (5 pages).

* cited by examiner

METHOD AND SYSTEM FOR MANAGING BATTERIES IN A VEHICLE

FIELD OF THE INVENTION

The present invention relates to a system and method for managing batteries in a vehicle and more particularly in vehicles which run at least partly on electric power such as electric vehicles, hybrid vehicles and the like.

BACKGROUND OF THE INVENTION

Today, technological development and research is directed towards producing environment-friendly vehicles keeping in mind the reduction of fossil fuels. Accordingly, electric vehicles are a more suitable option as they are non-polluting and reliable in terms of linear performance. Pollution has been a major concern and electric vehicles are quite a relief as they are far better for the environment. Whereas vehicles with combustion engines running on fuel such as diesel, petrol and the like burn fuel and emit harmful gases, electric vehicles produce fewer greenhouse gases and air pollution.

It is not surprising that petrol/diesel vehicles are getting replaced by Electric Vehicles (EVs) and hybrid vehicles. A hybrid vehicle runs on both combustion engine and battery depending upon the power needs while driving. An EV consist of mainly battery, a Vehicle Control unit (VCU), a Motor control unit (MCU), a motor and a wiring harness. Battery plays a major role in the vehicle performance, weight and cost.

Battery consists of mainly cells, interconnectors and a BMS (a Battery Management System). Different types of cells are available in the market today. The cell selection of batteries is mainly based on their capacity and operating voltage that can meet the vehicle requirements if arranged in a particular configuration that is selected based on the size of the battery pack. The battery size and weight play a major role in the vehicle weight and cost as well as the battery capacity decides the range of the vehicle.

The battery life depends on the life of the cell which in turn depends on the discharge and charge rate. It is well known that the battery is a major cost in an electric vehicle and the warranty of vehicle mainly depends on the battery life. So, it is very important to monitor the health of battery and make user aware of his/her battery health.

There are battery management systems known in the art which estimate a battery life based upon a first status of the battery and a second status of the battery and displaying the estimated battery life to the user. Such systems just display an estimated life of the battery, and a lot more remains to be desired from such systems.

Further in the prior art, battery management systems are available which consider battery parameters and vehicle parameters to identify a limited number of problems in the battery health. There are such systems available which are capable of taking very limited preventive measures on its own as per the problems identified. These systems work as a black box and the user is not informed in real time for the preventive measures that can be taken to maintain better health.

It can be appreciated that although the prior art tries to provide battery management systems, the systems provided are limited in application and limited with respect to the automatic preventive and corrective measures taken after identification of the problem.

Thus, there is a need in the art for a battery management system for a vehicle running on electric power, which addresses at least the aforementioned problems.

SUMMARY OF THE INVENTION

In one aspect, the present invention is directed at battery management system for managing a set of batteries in a vehicle. The battery management system includes a set of battery management units, a communication module and a vehicle monitoring unit. The set of battery management units includes a battery management unit for each battery in the set of batteries. Each battery management unit manages its respective batteries in the set of batteries. The communication module enables communication with the battery management system and also within the battery management system. The vehicle monitoring unit receives and monitors system information data including vehicle information data from the vehicle and battery information data pertaining to each of the batteries in the set of batteries from the respective battery management units. The system information data is received using the communication module. The vehicle monitoring unit is configured to generate a user message based upon a comparison of the system information data and predetermined standard acceptable system information values. The user message is communicated to a user of the vehicle.

In an embodiment, the battery management system includes a remote server for storing the system information data. The battery information data includes battery parameter values pertaining to the batteries. The vehicle information data includes vehicle parameter values pertaining to the vehicle. The vehicle monitoring unit sends the system information data to the remote server for storing at a predetermined server intervals of time.

In an embodiment the battery management units monitor the batteries and are configured to communicate the battery information to the vehicle monitoring unit at a predetermined vehicle intervals of time.

In an embodiment, the vehicle monitoring unit is configured to generate a warning signal based upon a comparison between the system information data received by the vehicle monitoring unit and the predetermined standard acceptable system information values.

In another embodiment, the server is configured to generate the warning signal based upon a comparison between the system information data stored at the server and the predetermined standard acceptable system information values. The warning signal is communicated to the user of the vehicle.

In an embodiment, the communication module includes a cluster communication module for communicating the warning signal to the user via a cluster display of the vehicle. The communication is in the form of the user message displayed on a display unit being read by the user.

In an embodiment, the user message is one chosen from a set of pre-set messages based upon the warning signal generated and communicated by the vehicle monitoring unit to the cluster communication module. The user takes an action based upon the user message.

In another aspect, the present invention is directed at a method for managing batteries in a vehicle. Each of the batteries has a battery management unit. The vehicle has a vehicle monitoring unit. The method includes receiving battery information, receiving vehicle information, generating a real time failure estimation based upon the information received, and providing a user message regarding the failure estimation. The method includes receiving the battery information via the battery management unit. The battery information includes battery parameters relating to a battery condition. The battery information is received by the vehicle monitoring unit. The method includes receiving the vehicle information via the vehicle monitoring unit. The vehicle information includes vehicle parameters relating to the vehicle driving conditions. The method includes generating the real time failure estimation via the vehicle monitoring unit based upon a comparison between the information received and a predetermined threshold parameter values. The user message regarding the failure estimation to the user is displayed via an instrument console.

In an embodiment, the method includes sending, via the vehicle monitoring unit, the battery information and the vehicle information to a remote server at predetermined intervals of time. The remote server stores the battery information and the vehicle information so received.

In an embodiment, the method includes generating, via a telematics unit, a failure prediction based upon the stored battery information and the stored vehicle information. The stored information includes parameters pertaining to vehicle driving pattern, battery charging pattern, load on the vehicle and the like.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention relates to a method and system for managing batteries in a vehicle. More particularly, the present invention relates to a method and system for managing batteries in a vehicle which at least partly runs on electric power.

Figure 1:
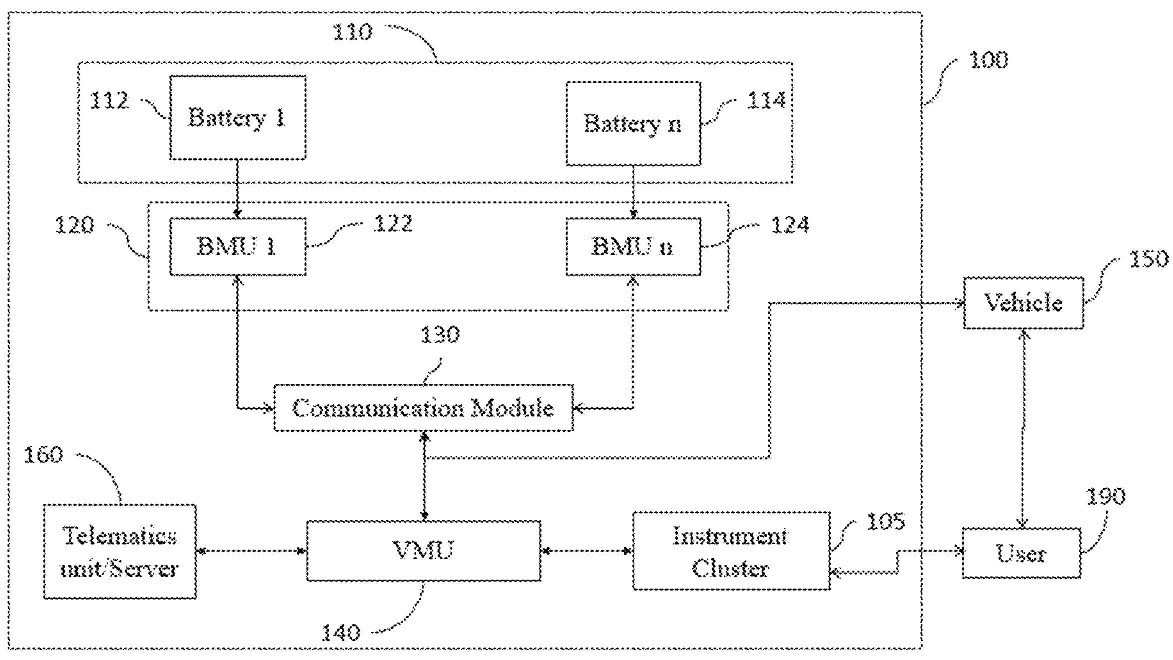
FIG. 1 illustrates a system for managing a set of batteries in a vehicle, in accordance with an embodiment of the invention.

FIG. 1 illustrates a system 100 for managing a set of batteries 110 in a vehicle 150, in accordance with an embodiment of the invention. Also shown is a user 190 of the vehicle 150. The number of batteries in the set of batteries 110 may vary with different embodiments and depends upon the vehicle power requirements.

The battery management system 100 includes a set of battery management units 120, a communication module 130, and a vehicle monitoring unit 140. The set of battery management units 120 has one dedicated battery management unit (122, 124) for each respective battery (112, 114) in the set of batteries 110. The battery management units 120 manage the respective batteries (112, 114). For example, the battery management unit 122 manages the battery 112 and the battery management unit 124 manages the battery 114. The communication module 130 enables communication within the battery management system 100 for its various units and subsystems such as the battery managing unit 120, the vehicle monitoring unit 140 and the like. The communication module 130 also enables communication of the battery management system 100 with external devices such as a host computer, the user 190 of the vehicle and the like. The vehicle monitoring unit 140 receives and monitors system information data. The system information data includes the vehicle information data from the vehicle 150. The battery information data pertains to each of the batteries (112 and 114) in the set of batteries 110 and is received from the respective battery management units (122 and 124). The system information data is sent and received using the communication module 130. The vehicle monitoring unit 140 is configured to generate a user signal message based upon a comparison of the system information data and predetermined standard acceptable system information values. The user signal message is communicated to a user.

In an embodiment, the battery management system 100 includes a remote server 160 for storing the system information data related to the vehicle information and the battery information. The battery information data includes battery parameter values pertaining to the batteries 110. The vehicle information data including vehicle parameter values pertaining to the vehicle 150.

In an embodiment, the vehicle monitoring unit 140 sends the system information data to the remote server 160 for storing at a predetermined server intervals of time.

The system information data stored at the remote server 160 is accessible by a service person or owner of the vehicle 150 irrespective of the vehicle location and condition.

In an embodiment, the battery management units 140 monitor and control the batteries 110 and are configured to communicate the battery information to the vehicle monitoring unit 140 at a predetermined vehicle intervals of time. The battery information includes the parameters of batteries 110 such as voltage, current, temperature and the like. The battery management units 110 sends the battery information pertaining to such parameters to the vehicle monitoring unit 140 at predetermined vehicle intervals of time. In an embodiment, the predetermined vehicle intervals of time is of the order of a few seconds. In another exemplary embodiment, the predetermined vehicle intervals of time is of the order of few hundred seconds.

In an embodiment, the battery management units 140 are configured to communicate a battery warning to the vehicle monitoring unit 140 based upon a comparison of the battery information and a predetermined threshold value. For example, the battery management units 120 monitor the temperature of the batteries 110 and when the temperature of a battery 112 exceeds the predetermined threshold value of 60 degrees, the battery management units 120 communicate a battery waring to the vehicle monitoring unit.

In an embodiment, the vehicle monitoring unit 140 is configured to generate a warning signal based upon the battery warning and a comparison between the system information data received by the vehicle monitoring unit 140 and predetermined standard acceptable system information values. Here, the warning signal generated by the vehicle monitoring unit 140 pertains to a real time failure estimation in the vehicle based upon the system information being received at the predetermined vehicle intervals of time duration.

The system information data includes the battery information data, the vehicle information data and other like parameter values which affect vehicle performance and battery health. The vehicle information data pertains data related to the motor parameters of a motor of the vehicle, TPS data, ignition data, charging data and the like. The vehicle information data also includes data pertaining to the number of times fast charging of batteries is done, the frequency of the fast charging, the driving pattern of user, and the like. The predetermined standard acceptable system information values pertain to the values of these parameters which are accepted as a standard for optimal vehicle and battery performance. The predetermined standard acceptable system information values are customizable and set in the system 100.

In an embodiment, the server 160 is configured to process the stored system information and generate the warning signal based upon a comparison between the processed and stored system information data and the predetermined standard acceptable system information values. The warning signal is communicated to the user 190. Here, the warning signal generated by the server 160 pertains to a failure prediction in the vehicle based upon the stored system information which is the historical data pertaining to battery usage and vehicle driving pattern.

In an embodiment, the communication module includes a cluster communication module for communicating the warning signal to the user via a cluster display of the vehicle 150. The communication is in the form of the user message. The user message is displayed on a display unit being read by the user. In an embodiment, the cluster communication module is a mobile device, remotely connected to display the user message. For example, the vehicle 150 may have been idle for months and battery may have been draining out on its own, the user 190 gets an alert on his mobile device at a remote location via a communication network regarding the same and is free to take an immediate action or delay his action as per circumstances.

In an embodiment, the user message is one chosen from a set of pre-set messages based upon the warning signal generated. The user 190 is then free to take action as per the user message. Taking an action is as per the discretion of the user 190, who may or may not take an action depending upon the circumstances.

Figure 2:
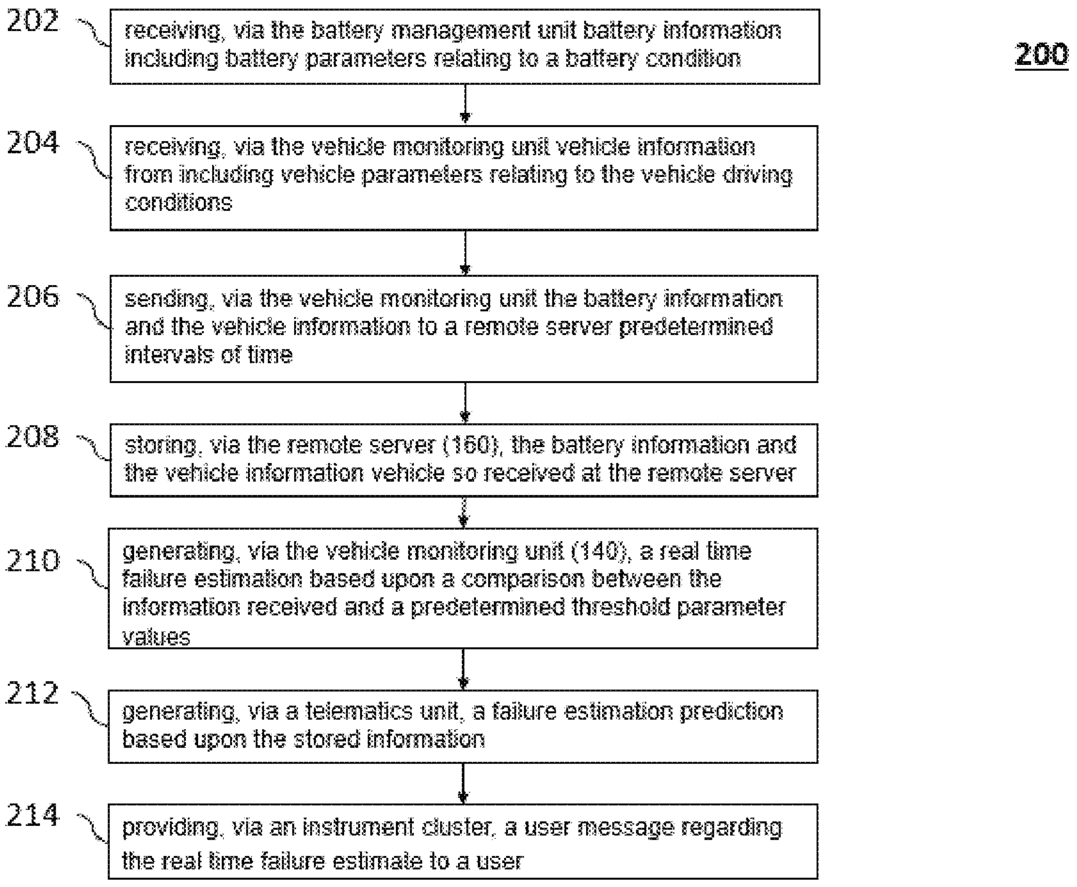
FIG. 2 is a flowchart illustration of a method for managing batteries in a vehicle, in accordance with an embodiment of the invention.

FIG. 2 is a flowchart illustration of a method 200 for managing batteries 110 in a vehicle 150, in accordance with an embodiment of the invention. Each of the batteries 110 has a battery management unit 120. Batteries (112 and 114) have battery management units (122 and 124) respectively. The vehicle 150 has a vehicle monitoring unit 140. The method 200 includes steps 202, 204, 210, and 214. At step 202, the method includes receiving by the vehicle monitoring unit 140, via the battery management units (122,124) of the batteries (112, 114), battery information including battery parameters relating to a battery condition.

At step 204, the method 200 includes receiving, via the vehicle monitoring unit 140, vehicle information from the vehicle. The vehicle information including vehicle parameters relating to the vehicle driving conditions.

At step 210, the method 200 includes generating, via the vehicle monitoring unit 140, a real time failure estimation based upon a comparison between the information received and a predetermined parameter values.

At step 214, the method 200 includes providing, via an instrument cluster, a user message regarding the real time failure estimate to a user.

Examples of real time user messages are:

a. "Battery temperature is high. No fast charging will be allowed."

b. "Battery temperature increasing due to continuous driving in Power mode. Drive in ECO mode else no fast charging is possible"

c. "Battery error Do not drive the vehicle."

In an embodiment, the method 200 includes steps 206 and 208. At step 206, the method 200 includes sending, via the vehicle monitoring unit 140, the battery information and the vehicle information to a remote server 160 at predetermined intervals of time.

At step 208, the method 200 includes storing, via the remote server 160, the battery information and the vehicle information so received at the remote server 160.

In an embodiment the method 200 includes step 212. At step 212, the method 200 includes generating, via a telematics unit, a failure prediction based upon the stored battery information and the stored vehicle information. In various embodiments, the stored information includes parameters pertaining to vehicle driving pattern, battery charging pattern, and load on the vehicle. Here, the warning signal generated by the telematics unit pertains to a failure prediction in the vehicle based upon the stored system information which is the historical data pertaining to battery usage and vehicle driving pattern.

Advantageously, the system and method for managing batteries provided by the invention enables a use to monitor and maintain battery health in real time and take discretionary decisions regarding preventive of corrective actions. The invention reduces the rate of battery capacity degradation, and this increases vehicle performance.

Further, the invention enables longer life of the batteries as problems associated with overheating due to frequent charging, deep discharging of batteries and rough usage of batteries are identified in real time and the user is communicated regarding the same and is free to take appropriate action.

While the present invention has been described with respect to certain embodiments, it will be apparent to those skilled in the art that various changes and modification may be made without departing from the scope of the invention as defined in the following claims.

The invention claimed is:

1. A battery management system for managing a set of batteries in a vehicle, the battery management system comprising:

a set of battery management units including a battery management unit for each battery in the set of batteries, the set of battery management units managing respective batteries in the set of batteries;

a communication module for enabling communication with the battery management system and within the battery management system;

a vehicle monitoring unit configured to receive and monitor system information data including:

vehicle information data from the vehicle; and battery information data pertaining to each of the batteries in the set of batteries from the set of battery management units, wherein the system information data is received using the communication module; and a remote server for storing the battery information data including battery parameter values pertaining to the batteries and the vehicle information data including vehicle parameter values pertaining to the vehicle, wherein the vehicle monitoring unit is further configured to:

generate a user message based upon a comparison of the system information data and predetermined standard acceptable system information values;

communicate the user message to a user, and the remote server is configured to process the stored system information data and generate a warning signal based upon a comparison between the processed system information data and the stored system information data and the predetermined standard acceptable system information values, the warning signal being communicated to the user.

2. The battery management system as claimed in claim 1, wherein the vehicle monitoring unit sends the system information data to the remote server for storing at a predetermined server intervals of time.

3. The battery management system as claimed in claim 1, wherein the set of battery management units monitor and control the batteries and are configured to communicate the battery information to the vehicle monitoring unit at a predetermined vehicle intervals of time.

4. The battery management system as claimed in claim 1, wherein the set of battery management units are configured to communicate a battery warning to the vehicle monitoring unit based upon a comparison of the battery information and a predetermined threshold value.

5. The battery management system as claimed in claim 1, wherein the vehicle monitoring unit is configured to generate the warning signal based upon the battery warning and a comparison between the system information data received by the vehicle monitoring unit and the predetermined standard acceptable system information values.

6. The battery management system as claimed in claim 1, wherein the communication module includes a cluster communication module for communicating the warning signal to the user via a cluster display of the vehicle, the communication being in a form of the user message, the user message being displayed on a display unit being read by the user.

7. The battery management system as claimed in claim 6, wherein the user message is one chosen from a set of pre-set messages based upon the warning signal generated, the user taking an action based upon the user message.

8. A method for managing batteries in a vehicle, each of the batteries having a battery management unit, the vehicle having a vehicle monitoring unit, the method comprising:

receiving, via the battery management unit of the batteries, a battery information including battery parameters relating to a battery condition, the battery information being received by the vehicle monitoring unit;

storing, with a remote server, system information data that include battery information data including battery parameter values pertaining to the batteries and vehicle information data including vehicle parameter values pertaining to the vehicle;

processing, with the remote server, the stored system information data and generate a warning signal based upon a comparison between the processed system information data and the stored system information data and predetermined standard acceptable system information values, the warning signal being communicated to a user;

receiving, via the vehicle monitoring unit, a vehicle information from the vehicle, the vehicle information including vehicle parameters relating to vehicle driving conditions;

generating, via the vehicle monitoring unit, a real time failure estimation based upon a comparison between the information received and a predetermined parameter values; and providing, via an instrument cluster, a user message regarding the real time failure estimate to the user.

9. The method as claimed in claim 8, further comprising:

sending, via the vehicle monitoring unit, the battery information and the vehicle information to a remote server at predetermined intervals of time; and storing, via the remote server, the battery information and the vehicle information so received at the remote server.

10. The method as claimed in claim 9, further comprising:

generating, via a telematics unit, a failure prediction based upon the stored battery information and the stored vehicle information, the stored information including parameters pertaining to vehicle driving pattern, battery charging pattern, and load on the vehicle.

* * * * *